United States Patent [19]
Bejot

[11] 3,768,601
[45] Oct. 30, 1973

[54] DISC BRAKE AND ADJUSTING DEVICE THEREFOR
[75] Inventor: Philippe Bejot, Paris, France
[73] Assignee: Societe Anonyne D.B.A.
[22] Filed: Jan. 10, 1972
[21] Appl. No.: 216,353

[30] Foreign Application Priority Data
Jan. 12, 1971  France .............................. 7100748

[52] U.S. Cl.......... 188/71.9, 188/196 D, 192/111 A
[51] Int. Cl............................................ F16d 65/56
[58] Field of Search................. 188/71.8, 71.9, 370, 188/196 D, 196 P, 217; 192/111 A, 70.25

[56]  References Cited
UNITED STATES PATENTS
| | | | |
|---|---|---|---|
| 2,844,224 | 7/1958 | Bricker et al................ | 188/196 P X |
| 3,491,859 | 1/1970 | Farr.............................. | 188/71.9 X |
| 2,900,052 | 8/1959 | Frayer et al. ....................... | 188/71.8 |
| 3,255,846 | 6/1966 | Livezey....................... | 192/111 A X |

Primary Examiner—George E. A. Halvosa
Attorney—Ken C. Decker

[57]  ABSTRACT

A caliper disc brake assembly includes an adjuster mechanism for maintaining the proper clearance between the brake shoes and the disc. The adjuster comprises two interconnecting elements and a member to permit one element to follow the movement of the piston in the brake actuating mechanism. A hollow ring filled with a compressible material such as pressurized gas is effective to retard or momentarily stop the movable element in the adjuster. Over-adjustment due to "panic stops" is thereby prevented.

8 Claims, 2 Drawing Figures

PATENTED OCT 30 1973

3,768,601

DISC BRAKE AND ADJUSTING DEVICE THEREFOR

BACKGROUND OF THE INVENTION

This invention relates to a brake, more particularly to a caliper disc brake having an automatic adjusting device.

Due to wear of the friction pads, a recurrent problem in modern disc brakes is maintaining the proper gap between the brake shoes and the rotor when the brakes are released. For this reason, many modern disc brakes have adjustment devices incorporated therein to automatically maintain the required clearance. Such devices have oftentimes been troublesome to service, due to the numerous springs, detents, racks, pinions, etc., that have been necessary in former designs. Also such designs did not permit fine adjustment of the clearance width.

Another troublesome problem with disc brake adjusters is their tendency to over-adjust when the brakes are applied suddenly in "panic-stop" situations. When high pressure is abruptly applied to the brakes, the piston movement is greater than normal because of higher elastic deflections of the brake members, often resulting in over-adjustment of the brake. In prior art devices, unless large retraction movement is provided in the adjuster, the shoes will sometimes drag against the disc after an over-adjustment caused by a panic stop, thus causing the shoes to wear quickly. If larger retraction is provided for, more travel of the actuating mechanism results. It is therefore desirable to limit operation of the adjustment mechanism to relatively low pressure levels.

SUMMARY OF THE INVENTION

Therefore, an important object of the present invention is to provide a disc brake with an automatic adjuster that continuously adjusts for lining wear.

Another important object of the present invention is to furnish an automatic adjuster having considerably fewer parts than other similar devices.

Yet another important object of the invention is to prevent operation of the adjuster mechanism when pressures in excess of a predetermined level are developed in the brake as a result of, for example, a panic stop.

A further object of the invention is to provide an adjuster capable of assisting the return movement of the actuating mechanism.

DETAILED DESCRIPTION

Figure 1:
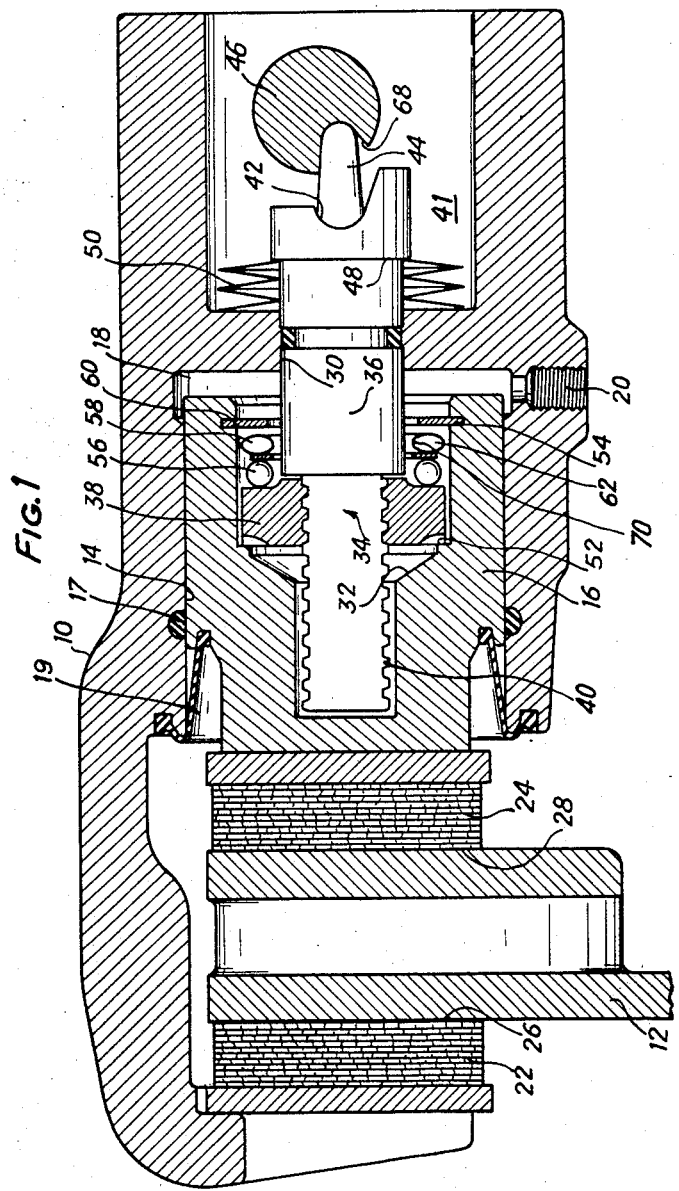
FIG. 1 is a fragmentary, cross-sectioned detail view of a disc brake made pursuant to the invention, illustrating the brake actuating mechanism and the automatic adjusting device included in this mechanism, the mechanism being in the brake released position.

Referring now to the drawings, a disc brake assembly includes a caliper 10 having a bridge piece that straddles a rotatable disc 12. The disc 12 is bolted to a vehicle wheel not shown for rotation therewith. A fixed support not shown, secured to a fixed part of the vehicle such as a spindle housing supports the caliper 10 for longitudinal sliding motion with respect to the disc 12. A pair of opposed friction pads 22, 24, are provided on opposite sides of the disc 12 for engagement with friction surfaces 26, 28 of the disc for stopping the vehicle (not shown). The mounting of the caliper on the fixed support is more fully explained in U.S. Pat. No. 3,388,774 assigned to Bendix Corporation.

Caliper 10 includes a housing with a bore 14 in which a chamber 18 is defined. Bore 14 slidably and non-rotatably receives a piston 16 for urging the pads 22, 24, into engagement with the disc 12 to stop the vehicle. An opening 20 admits fluid pressure into the chamber 18 to act against a rear face of the piston 16. The usual seal 17 is provided between the piston 16 and the bore 14 to prevent fluid from escaping therefrom. A resilient boot 19 is provided interconnecting the piston 16 and the bore 14 to prevent foreign material from interfering with the operationg of the piston.

After a number of brake applications, wear of the friction pads 22, 24, due to their contact with the disc 12 enlarges the clearance between the pad and the disc when the brakes are released. To maintain this clearance distance constant, an adjusting device 34 is provided. Device 34 includes a nut 38 rotatable on a post portion 40 of an elongated member 36 coaxial with the piston 16. Complementary long pitch screw threads on the nut 38 and the post 40 respectively are of the type that permit the nut 38 to rotate and therefore advance with the piston 16 when a force acting parallel to the axis of the member 36 is applied to the nut 38 through an anti-friction bearing 56 by a washer 54 carried by the piston 16 during movement of the piston toward the rotor 12. However, if a similar force acting in the opposite direction acts on the nut 38 at the shoulder 52 during return movement of the piston, the threads lock to prevent backward movement of the nut. Forward movement of the piston 16 thus engages the washer 54 with the anti-friction bearing 56 which engages the nut 38, thus causing the nut to turn.

According to the invention, a hollow ring 62 filled with compressible material is interposed between the washer 54 and the anti-friction bearing. The hollow ring 62 and its function will be more fully described later and, thus far, it is sufficient to say that the ring can be deformed by a fluid pressure in excess of a predetermined level, and is restored to its original shape when the pressure subsides.

To provide a mechanical actuator for use as a parking brake, the caliper housing further includes a compartment 41 and a bore 30 interconnecting the chamber 18 with the compartment 41. The bore 30 sealingly and slidably supports the elongated member 36. A shaft 46 is pivotally mounted in the compartment 41, and a toggle 44 interconnects the shaft and the elongated member, respective ends of the toggle 44 being received in grooves 42, 68, formed transversely in the end of the member and axially in the shaft respectively. A stack of Belleville washers 50 is disposed between a wall of the bore 30 and a shoulder 48 of the elongated member 36. It will be understood that rotation of the shaft 46, for example by means of a handle not shown, forces the elongated member 36 and the piston 16 forward to apply the friction pads. However, when the parking brake is not in use, the spring biased toggle link connection between member 36 and shaft 46 is such that, for all practical purposes, the elongated member 36 is fixedly and non-rotatably secured to the caliper housing 10.

MODE OF OPERATION

In normal operation, the vehicle operator depresses the brake pedal which causes fluid to flow through the opening 20 and act upon the rear face of the piston 16, forcing the latter toward the disc 12. Movement of the piston 16 engages friction pad 24 with disc 12, and those skilled in the art will recognize that reaction forces acting through the caliper 10 will also engage the pad 26 with the disc 12, thus stopping the vehicle.

The adjusting device is initially so positioned that, when the brakes are fully applied, the piston travel will be such that the washer 54 will engage the thrust bearing 56 through the hollow ring 62. Release of the brakes causes resilient seal 17 to move the piston 16 away from the disc until the shoulder 52 of piston 16 contacts the nut 38. Of course, when the brakes are released, there will be a clearance between the washer 54 and the hollow ring 62 as illustrated in FIG. 1.

In the brake release position illustrated in FIG 1, the shoulder 52 on the nut 38 engages the rear face of the piston 16, and surface 60 of the washer 54 is spaced from surface 58 of the hollow ring 62.

Each brake application results in some material being worn from the pads 22, 24. After repeated applications, enough material will be worn from the pads 22, 24, to increase the clearance between the pads and the disc when the brakes are released, unless the stroke of the piston 36 is adjusted to maintain the clearance constant. This function is performed by the adjusting device. As the friction pads 22, 24 wear, the increased distance the piston 16 must travel results in application of a force applied by the washer 54 through the hollow ring 62 and through the bearing 56 to the nut 48. Due to the design of the threads, the force causes the nut to turn relative to the washer 54, forcing it toward the disc 12. Upon release of the brakes, piston 16 moves away from the disc 12 until shoulder 52 contacts the nut, thus stopping movement of the piston 16. Since washer 54 is carried by the piston, nut 38 is always advanced the proper amount to assure the correct clearance between the disc 12 and the pads 22, 24.

At low levels of fluid pressure, the adjuster 46 operates as described above. The hollow ring 62 experiences substantially no change in thickness and behaves merely as a spacer member. However, during a "panic stop," when the piston travel becomes much larger than normal due to the elastic deflection of the various brake parts caused by the high fluid pressure applied to the piston, further adjustment would normally take place, since the piston 16 would travel an abnormally greater distance toward the rotor 12, thereby causing washer 54 to advance the nut 38 toward the rotor 12 a greater distance than would be required due to wear of the friction elements. Prior art brakes compensate for this condition by providing a brake in which the piston retracts a greater distance to avoid drag of the friction elements against the rotor when the brake is released. However, this solution is undesirable since more applying stroke must be used in the parking brake mechanism and degree of adjustment will vary depending upon what pressures had previously been encountered.

Figure 2:
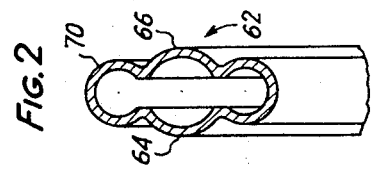
FIG. 2 is an enlarged fragmentary, cross-sectional detail view of a resiliently compressible annular member included in the adjusting device shown in FIG. 1.

In the present invention, this problem is solved by the provision of hollow ring 62. Hollow ring 62 comprises a relatively thin metal envelope filled with a compressible material, preferably a compressible liquid or a pressurized inert gas. The envelope has a generally elliptic cross-section permitting the thickness of the ring to decrease when the ring is placed in a pressurized medium. Preferably, the thickness of the ring decreases only slightly or experiences no change as long as the pressure of the medium is below a predetermined level but decreases sharply when the predetermined level is reached and the ring resumes its original shape when the pressure is relieved. FIG. 2 illustrates an exemplary embodiment of the hollow ring 62, in which the opposite sides of the ring have a wavy surface defined by a circular ridge 64,66, formed on each side and by rounded outer and inner edge portions 70. The operating mode of the hollow ring 62 cannot be ascertained as satisfactory results have been obtained with rings of various shape, including that shown in FIG. 2. In some cases, it may be assumed that the braking pressure builds up rapidly in the chamber 18, and that the ring 62 has a fast response to compression, such that the fluid pressure in chamber 18 has produced a substantial compression of the ring 62 before shoulder 52 of the piston 16 has moved out of engagement with the nut 38. Then, the clearance between the surface 60 of washer 54 and the surface 58 of ring 62 will be increased, and the driving engagement of piston 16 with nut 38 will be retarded. In other cases, assuming that the ring 62 yields only then when its surface 58 is already engaging the surface 60 of washer 54, the nut will momentarily stop following the movement of the piston, thus allowing the piston to move in a panic braking over a distance greater than normal without causing an excessive travel of the nut, thereby avoiding over adjustment of the brake. It will be noted that the ring 62 participates in returning the piston when the braking pressure is relieved.

The invention has been described with respect to an embodiment including an adjusting device of the type comprising a screw and nut arrangement, and a low friction thrust washer to permit the nut to follow the movement of the piston by rotating and travelling on the screw, but it will be understood that the invention can be applied to embodiments including other types of adjusting devices wherein an element is adapted to follow the movement of the piston in one direction, but not in the reverse direction.

What I claim is :

1. In a disc brake:
   a rotor having a pair of friction faces;
   a pair of friction elements, one of said friction elements being disposed adjacent each of said friction faces;
   a fixed support;
   a caliper slidably mounted on said fixed support and straddling said rotor to engage each of said friction elements to urge the latter into braking engagement with their corresponding friction faces upon actuation of the caliper when a brake application is effected;
   said caliper including a housing defining a bore therewithin, a piston slidably mounted in said bore, means for communicating fluid pressure into said bore when a brake application is effected to urge said piston toward the rotor to thereby actuate said caliper;

adjuster means carried in said bore to engage said piston upon retraction of the latter when the brake is released to limit retraction of the piston to a predetermined amount, means carried by said piston and normally separated from operative engagement with said adjuster means by a predetermined distance, said means carried by said piston urging said adjuster means toward said rotor after movement of the piston toward the rotor in excess of the predetermined distance, and compressible resilient means disposed between the adjuster means and the means carried by the piston, said resilient means being compressible in response to the fluid pressure level in said bore to thereby increase the predetermined distance through which said piston must travel to bring the means carried by said piston into operative engagement with said adjuster means.

2. The invention of claim 1; and
a threaded post mounted within said bore, said adjuster means being threadedly connected to said post and responsive to the urging of the means carried by said piston to advance on said post toward the rotor.

3. The invention of claim 2:
said resilient means being contained within an annular, thin-metal resilient envelope.

4. The invention of claim 3, wherein said annular envelope contains a comressible liquid.

5. The invention of claim 4, wherein said annular envelope is shaped to resiiliently yield above a predetermined level of said fluid pressure.

6. The invention of claim 3, wherein said annular envelope contains pressurized gas.

7. The invention of claim 6, wherein said annular envelope is shaped to resiliently yield above predetermined level of said fluid pressure.

8. The invention of claim 7, wherein said annular envelope is substantially elliptic in cross-section and has circular ridges formed on its opposite sides to define wavy surfaces.

* * * * *